United States Patent [19]

Everett

[11] 4,363,212
[45] Dec. 14, 1982

[54] BUOYANCY PRIME MOVER

[76] Inventor: Thomas D. Everett, P.O. Box 29097, Indianapolis, Ind. 46229

[21] Appl. No.: 260,390

[22] Filed: May 4, 1981

[51] Int. Cl.³ .......................... F03G 7/00; F03B 9/00
[52] U.S. Cl. ....................................... 60/496; 415/5; 415/7
[58] Field of Search .................. 137/574; 60/495, 496; 415/5, 7

[56] References Cited

U.S. PATENT DOCUMENTS

| 29,149 | 7/1860 | Durham | 60/496 |
|---|---|---|---|
| 124,843 | 3/1872 | Millard | |
| 211,143 | 1/1879 | Fogarty | |
| 212,186 | 2/1879 | Burwell | |
| 758,078 | 4/1904 | Jardine | 137/574 |
| 1,483,505 | 2/1924 | Bradshaw | 415/5 |
| 2,037,973 | 4/1936 | Grondahl | 60/22 |
| 2,135,110 | 11/1938 | Platt | 60/496 |
| 2,513,136 | 6/1950 | Borsos | 60/496 |
| 3,194,008 | 4/1965 | Baumgartner | 60/22 |
| 3,466,866 | 9/1969 | Eschenfeld | 60/496 |
| 3,907,454 | 9/1975 | Punton | 60/496 |
| 3,918,827 | 11/1975 | Conn et al. | 415/5 |
| 3,934,964 | 1/1976 | Diamond | 415/7 |
| 4,038,826 | 8/1977 | Shaw | 60/496 |
| 4,054,031 | 10/1977 | Johnson | 60/496 |

FOREIGN PATENT DOCUMENTS

| 56052 | 6/1912 | Austria | 60/496 |
|---|---|---|---|
| 77646 | 6/1949 | Czechoslovakia | 60/496 |
| 52-1249 | 7/1977 | Japan | 60/495 |
| 2782 | of 1873 | United Kingdom | 60/496 |

Primary Examiner—H. Jay Spiegel
Attorney, Agent, or Firm—McDougall, Hersh & Scott

[57] ABSTRACT

A buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power.

8 Claims, 10 Drawing Figures

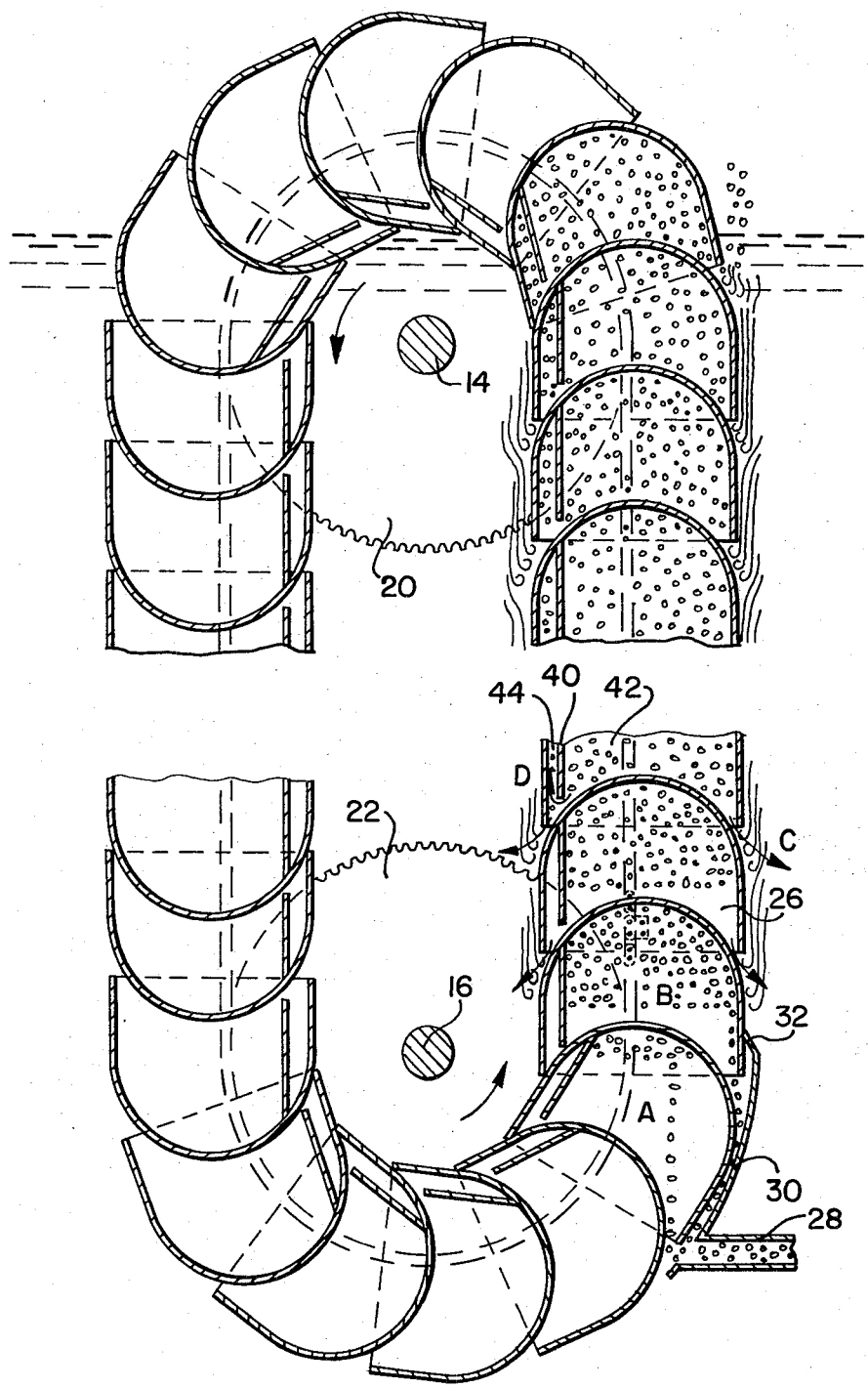

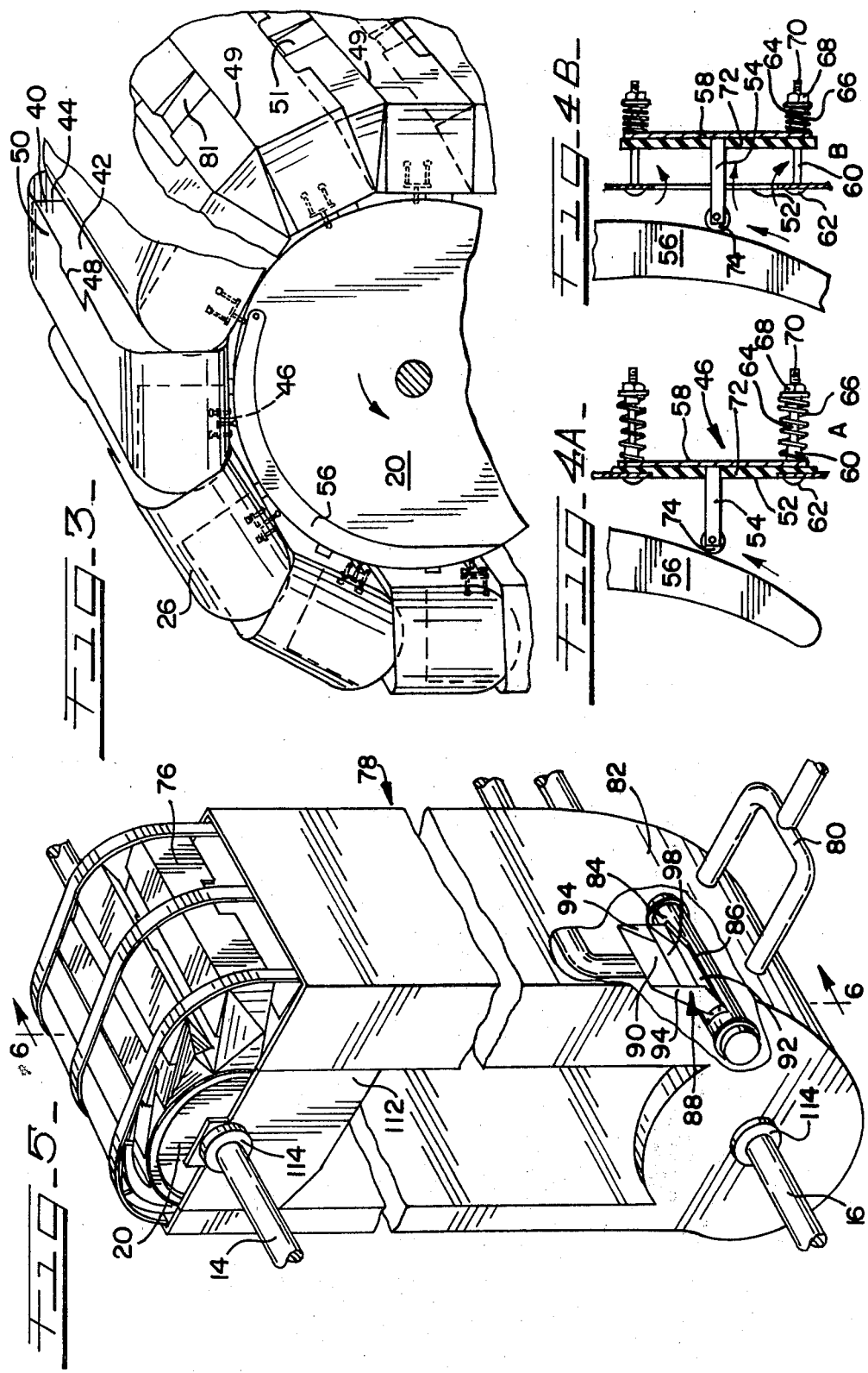

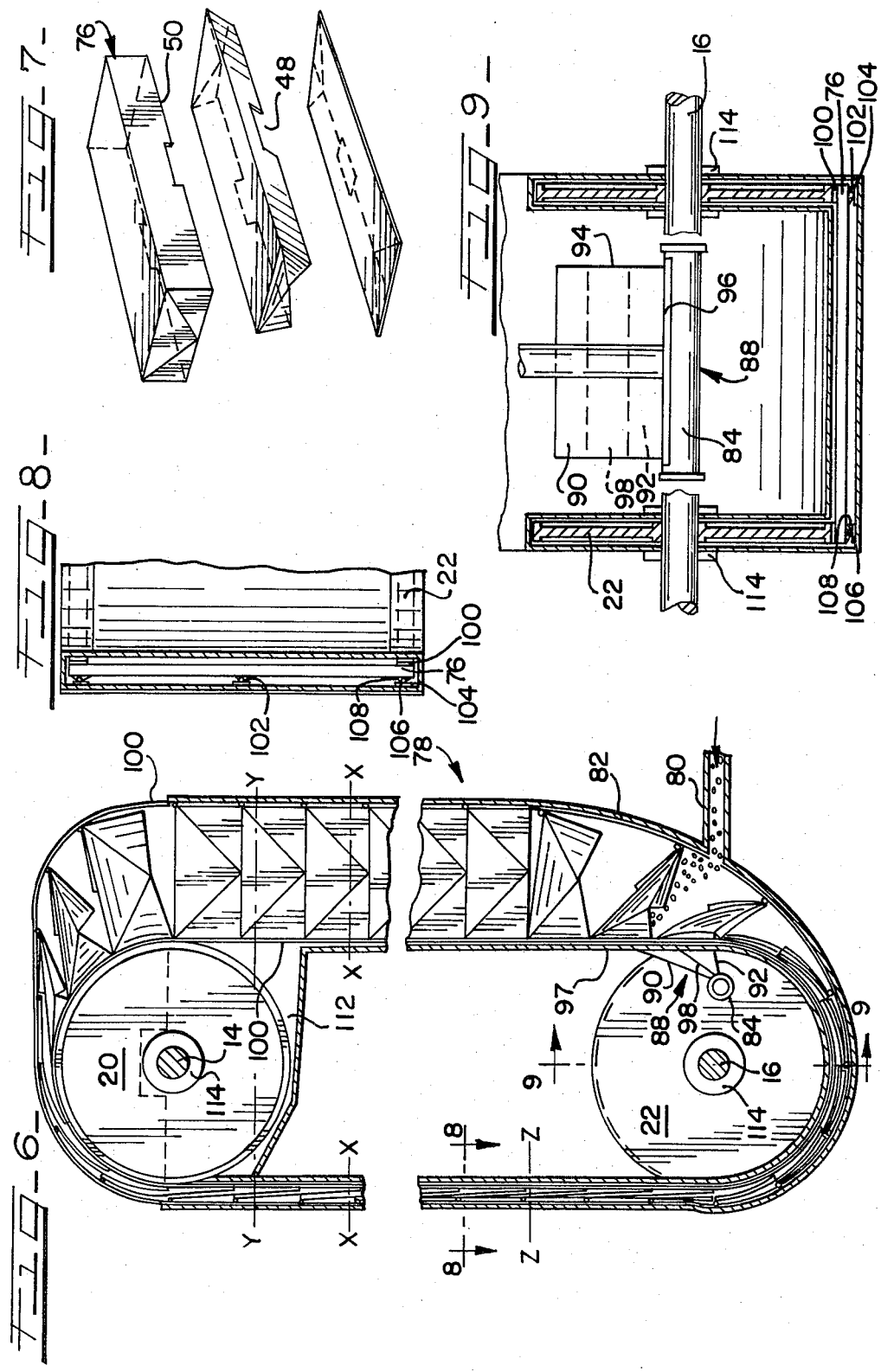

BUOYANCY PRIME MOVER

BACKGROUND OF THE INVENTION

The present invention relates to the generation of power by buoyant forces and particularly to an apparatus that converts the potential energy of a gas buoyant within a liquid into rotating mechanical energy.

When a gas is introduced into a liquid that is more dense than the gas, the buoyant forces acting on the gas will cause the gas to rise. If a container is placed in the path of the rising gas, the gas will enter the container and displace an equal volume of liquid from the container. According to Archimedes' principle, this will create a force of buoyance ($F_B$) in the bucket equal to the weight of the displaced liquid.

A practical use of this principle involves attaching a plurality of buckets to a chain or belt to form a continuous loop. The buckets can move in a vertical direction upwards or downwards through the liquid. That configuration is well known to those skilled in the art. However, the efficient use of the buoyant forces developed requires an apparatus that minimizes any non-vertical movements of the buckets and provides for the rapid entry of gas into the buckets in addition to the rapid displacement of liquid from the buckets. The present invention is directed to this problem of efficient power generation.

DESCRIPTION OF THE PRIOR ART

The prior art includes many examples of machines comprising buckets joined by chain assemblies which can be immersed in water to generate power. The following references constitute the closest prior art of which applicant is aware.

U.S. Pat. No. 124,843 to Millard discloses buckets arranged to form a continuous loop. The buckets are moved downwardly by the action of gravity upon the water which creates an unbalanced force and rotates a series of sprockets and a connected shaft. This is a form of bucket elevator that has been used in many forms over the years. The Millard apparatus includes buckets at the upper end of the loop which are completely exposed to the atmosphere. The buckets of the present invention, however, must be at least partially immersed in the liquid for efficient power production.

U.S. Pat. No. 211,143 to Fogarty shows a turbine rotated by a wheel to harness buoyant forces. The Fogarty apparatus, as will be demonstrated, is very inefficient when compared to the present invention. Gas enters the liquid and rises into the lowest bucket of the wheel to displace a volume of liquid. Fogarty, however, does not provide for the efficient movement of gas and liquid during that transfer. Such a provision is fundamental to the operation of the present invention. The force of buoyancy ($F_B$) created by the gas in the liquid causes the Fogarty wheel to rotate about its axis. When the lowest bucket is completely filled with gas, that bucket will begin to displace the gas as soon as the wheel rotates from the lowest position. This gas escape or spillage will continue at an increasing rate as the wheel turns. At approximately 120° of rotation, the lowest bucket is totally devoid of gas so that power is being generated inefficiently during the cycle.

The present invention recognizes that a certain energy input is necessary to introduce the gas into the liquid. This gas is captured, retained and fully utilized during its rise in the liquid to make better use of the energy input than does the Fogarty device. Note also that the Fogarty device uses only about 33% of the buckets at one time while the present invention can use up to 49% of the buckets (depending upon depth of liquid and the bucket size used).

An additional feature that is fundamental to the present invention is the natural expansion of the gas as it rises in the liquid (due to a continually decreasing liquid pressure). As the gas expands, more liquid is displaced so that the $F_B$ acting on each bucket constantly increases during the rise. As a result, the bucket speed tends to increase, and the effect is more pronounced as the length of continuous loop of buckets is increased.

The preferred design of the present invention directs only enough gas into a bucket so that, as the bucket rises and the gas expands, the gas completely displaces the liquid in the bucket when the bucket reaches liquid level. Thus, the energy input is not wasted as gas slippage from the bucket which would be the case if the volume of the expanded gas became greater than that of the bucket during the vertical rise. This concept is not disclosed by the Fogarty reference.

U.S. Pat. No. 212,186 to Burwell shows an apparatus that is similar to the present invention in that it uses vertically linked chains acting on sprockets. The Burwell buckets, however, are very different from those of the present invention. In addition, Burwell uses the weight of water as the principal moving force and does not mention or use the force of buoyancy. Burwell notes that the top sprocket is above the liquid level. The present invention uses a top sprocket that may be partially or totally immersed in the liquid.

U.S. Pat. No. 2,037,973 to Grondahl discloses a continuous loop apparatus for power generation. The Grondahl apparatus, however, requires a continual replenishing of the liquid. This tends to make the device non-portable; whereas, portable use is a prime consideration for the present invention. In addition, Grondahl does not use buckets in which gas is inserted to harness buoyancy forces; instead, air-tight compartments or floats are used.

U.S. Pat. No. 3,194,008 to Baumgartner discloses a device that uses a ring or circular wheel and a friction drive to transfer power to an output shaft. The present invention can use friction drive or positive drive quite readily. That limitation of the Baumgartner invention is significant because frictional drives are very inefficient and limited in their ability to transmit torque. A friction drive also produces high wear points relative to gears or sprockets with chains. Baumgartner also uses a governor device to control speed. The present invention simply increases or decreases the amount of gas admitted to the buckets to control speed.

U.S. Pat. No. 3,918,827 to Conn shows a water pressure machine that does not feed a gas continuously into buckets to obtain buoyant forces, rather buoyant panels are used. Note that when these panels are descending, the total unbalanced force that is developed must be great enough to drive the buoyant panels downward against the buoyant force. The energy used to drive or push the buoyant panels downward decreases the energy produced on the rising side. The present invention uses bouyant forces only on the rising side of the chain. During the descent, the buckets are filled with liquid or are collapsed into a flat configuration and the buckets need not be driven downward against buoyant forces.

Conn does not address the friction and turbulence created on the rising side of the bucket chain by moving flat surfaces through the liquid. The present bucket design and arrangement, however, greatly minimizes these countervailing forces. The frictional resistance to flow of the buckets can reduce the bucket speed. The bucket design and arrangement of the present invention minimizes these forces of resistance while optimizing the harnessing of buoyant forces to provide for greater energy efficiency.

In addition, the present device uses the natural expansion of a rising gas. This requires a bucket that is closed on all sides but one. The gas can expand within the buckets and displace the liquid to create a greater buoyancy force as the buckets rise. The Conn bucket has a fixed displacement that does not change as the bucket rises or descends.

U.S. Pat. No. 3,934,964 to Diamond shows cylinders filled with a gas on one side of a vertical chain arrangement, while the gas is displaced on the other side of the chain. That general design is similar to the present invention. The Diamond apparatus uses a gravity-activated piston or a third fluid (mercury) to pump the gas through tubes from cylinders on the descending side of the continuous chain to cylinders on the rising side. By way of comparison, the buckets of the present invention act independently of each other and, other than collapsing, have no moving parts. The gas is fed into the present buckets by placing the source of gas directly below the buckets and allowing the gas to rise into the buckets. The Diamond piston assembly could severely restrict the speed of displacement which is a major consideration since rapid displacement is necessary to achieve any significant speed from a device of this nature. The ability to displace the gas and fluid rapidly is of fundamental importance to efficient power production.

In addition, Diamond does not emphasize streamlining or nesting the cylinders to present a solid wall rising and descending through the liquid. The joining tubes between cylinders would present practical limitations to displacement between cylinders, and would most certainly need replacement due to wear. The use of pistons in the cylinders is quite different from using open buckets without pistons.

Accordingly, there are many devices described in the prior art for the generation of power by harnessing a rising gas in a fluid. Some devices are quite primitive, while others reflect the current state of the art. The prior art, however, does not disclose the embodiments of the present invention.

SUMMARY OF THE INVENTION

The present invention relates to a buoyancy prime mover that converts the potential energy of a gas buoyant within a liquid into rotating mechanical energy. A prime mover as used herein is an initial source of motive power designed to receive and modify a force as supplied by a natural source and apply that force to drive machinery.

A gas is introduced at a given depth into a body of liquid. The rising gas is directed into inverted buckets that are linked together by one or more chains to form a continuous loop. The buckets can be rigid or collapsible. When the gas enters a bucket, an equal volume of liquid is displaced from the bucket. The trapped gas in each bucket exerts a vertical force of buoyance ($F_B$) on the bucket equal to the weight of the displaced liquid. Sprockets or pulleys, which guide the chain-bucket assembly and convert the linear motion of the chain into rotational motion, engage the chains at the top and bottom of the continuous loop. The sprockets are rotatably connected to supporting shafts which rotate on bearings with the sprockets. The chain-bucket assembly is mounted on a framework which provides the necessary stability and a means for support.

Because the gas rises vertically through the liquid, the only movement of the buckets should be in a vertical direction for optimum use of the buoyancy force ($F_B$). Any non-vertical bucket movement will produce a horizontal vector component of $F_B$ which would reduce the efficiency of the apparatus. Therefore, the present invention includes two parallel, vertical columns of the buckets evenly spaced on a chain to reduce vibration and to increase power input. One column moves upwardly as the buoyant forces act on the buckets. The buckets on the other column descend into the liquid. The gas is displaced from the buckets so that the upwardly directed buoyant force causes the loop to rotate in the direction of the buoyant force. A constant supply of gas produces a continuous bucket motion around the sprockets, and the total buoyant force at a given time is equal to the sum of the component buoyant forces in each bucket.

BRIEF DESCRIPTION OF THE DRAWINGS

FIG. 2 is a sectional view taken along the line 2—2 of FIG. 1;

FIG. 3 is a perspective view of a second embodiment of the present invention having buckets with liquid entry valves, displacement ports and a gas entry guide;

FIGS. 4A and 4B constitute a side view of a liquid entry valve to show the operation thereof in the open and closed positions;

FIG. 5 is a perspective view of a third embodiment of the present invention having collapsible buckets in an enclosed structure;

FIG. 6 is a sectional view taken along the line 6—6 of FIG. 5;

FIG. 7 shows the folding of a collapsible bucket;

FIG. 8 is a sectional view taken along the line 8—8 of FIG. 6; and

FIG. 9 is a sectional view taken along the line 9—9 of FIG. 6.

DETAILED DESCRIPTION OF THE INVENTION

Figure 1:
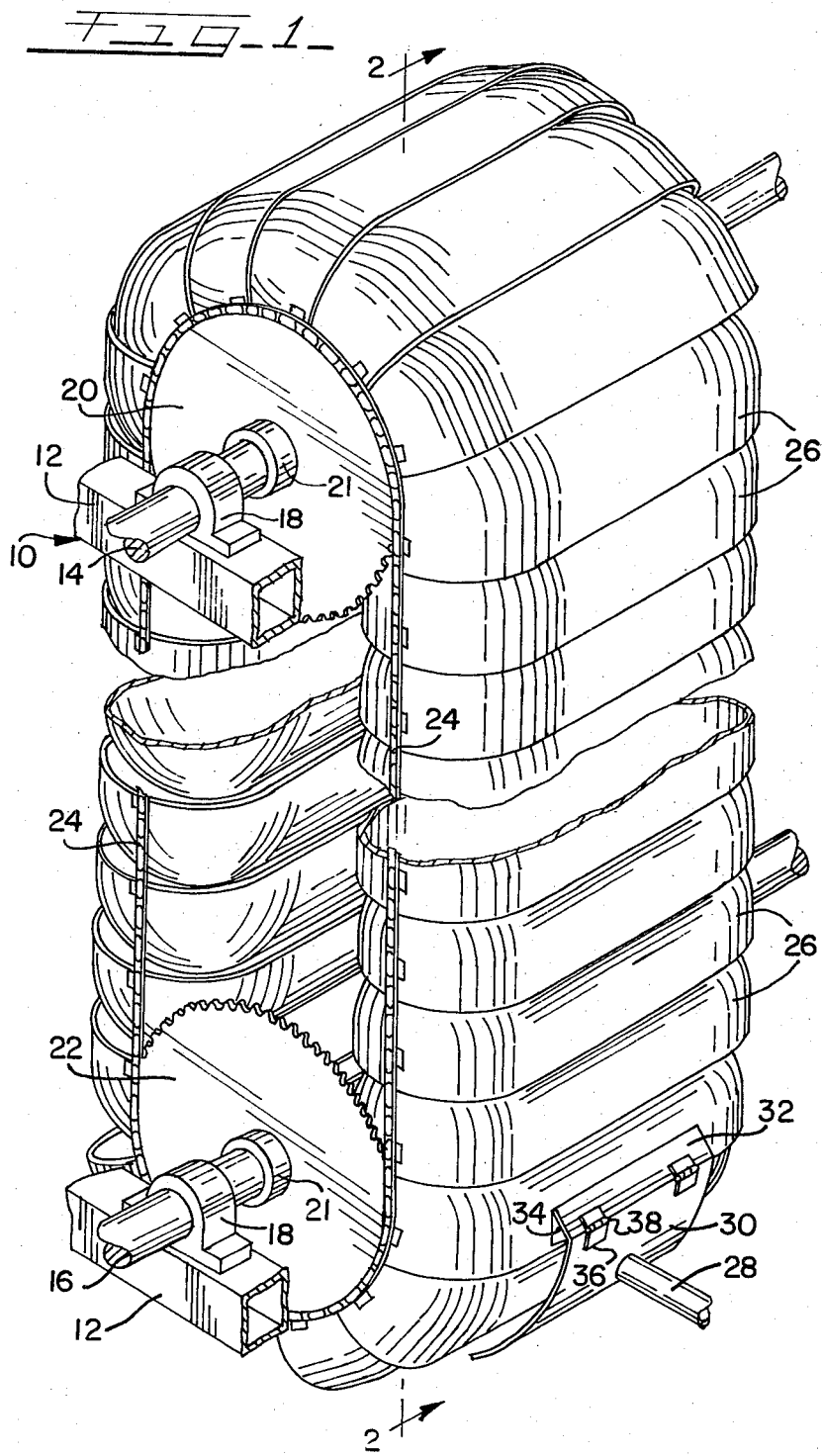
FIG. 1 is a perspective view of an embodiment of the present invention having rigid buckets.

Referring to FIG. 1, the apparatus of the present invention is supported by a frame assembly shown in part and indicated generally by the reference numeral 10. The frame assembly is adapted for immersion in a liquid, such as water, and includes beams 12 which support top and bottom shafts 14 and 16, respectively, that function to transfer the energy produced by the apparatus to the intended use. Bearing housings 18 contain bearings (not shown) to encircle the shaft and permit relatively friction-free shaft rotation. Both the top and bottom shafts should be positioned below the surface of the liquid.

Attached to the top shaft 14 is a set of upper sprockets 20 which rotate with the top shaft. A locking collar 21 fixes the position of each sprocket on the respective shaft. The upper sprockets can be adapted to rotate freely about the top shaft 14, but that would not enable power to be transferred from the top shaft. The sprockets 20 on the top shaft 14 are connected to a corresponding set of lower sprockets 22 on the bottom shaft 16 by roller-type chains 24 which engage teeth 25 on each sprocket so that each chain forms a continuous loop. The sprockets 20 and 22 must firmly engage the chain 24 to maintain a sufficient chain tension so that the chain does not slip from the sprocket teeth 25.

In addition, it is desirable to have a fixed end and an adjustable end of the frame assembly 10 to enable the tightening of chains which have loosened from wear and stretching. In preferred practice, the bottom shaft 16 of the frame assembly is fixed, while the top shaft 14 is adjustable to take up any chain slack. A number of chain tightening devices are suitable for use with the present invention; for example, constant-force helical springs positioned under the top shaft bearing housings 18 could function to maintain tension and tighten chains.

Located between a set of chains 24 is a plurality of buckets 26. Each bucket is generally ovoid in horizontal cross section and is connected at each end to a chain 24 by a riveted link 28. The buckets 26 comprise thin shelled containers of stamped metal or molded plastic which are capable of containing a gas or liquid. The bucket design must enable a plurality of buckets to pass through a liquid with minimum turbulence since the frictional resistance to flow of the buckets can reduce the chain speed and the efficiency of the apparatus. Therefore, streamlining or nesting one bucket within an adjacent bucket to form a solid wall that flows through the liquid is a fundamental aspect of the present invention.

Gas is admitted into each bucket 26 near the lower sprockets 22 through an inlet tube 28. Connected to the open end of the inlet tube is a deflecting plate 30 which functions to direct the rising gas towards the buckets. To further direct the gas flow is flange 32 having side extensions 34 which is secured to the upper edge of the deflecting plate 30 by hinges 36. A spring 38 secured about each hinge 36 maintains the flange 32 in contact with the outer side of a bucket 26 to minimize gas loss from leakage between the bucket side and the deflecting plate 30.

Because the gas rises vertically through the liquid, the only movement of the buckets should be in a vertical direction for optimum use of the buoyancy force ($F_B$). Any non-vertical bucket movement will produce a horizontal vector component of $F_B$ which would reduce the efficiency of the apparatus. Therefore, the chains 24 form a continuous loop having two parallel, vertical columns of the buckets evenly spaced on the chain to reduce vibration and to increase power input. One column moves upwardly as the buoyant forces act on the buckets. The buckets on the other column descend into the liquid. The liquid is displaced from the buckets at the bottom sprockets so that the upwardly directed buoyant force causes the continuous loop to rotate in the direction of the buoyant force. A constant supply of gas produces a continuous bucket motion around the sprockets 20 and 22, and the total buoyant force at a given time is equal to the sum of the component buoyant forces in each bucket.

The operation of the present invention can be better described with reference to FIG. 2. After the gas passes through the inlet tube 28, a portion of the gas rises into a bucket A and the remainder of the gas passes between the side wall of the bucket A and the deflecting plate 30 to pass into a bucket B positioned above bucket A. As will be described, the buckets can be rigid or collapsible. When the gas enters a bucket, an equal volume of liquid is displaced from the bucket as shown diagrammatically by the arrows C. A predetermined volume of gas is admitted into the buckets to cause the buckets to rise through the liquid and rotate the chains about the sprockets 20 and 22 in the indicated counter-clockwise direction. The sprockets convert the linear motion of the chains into rotational motion.

Fundamental to the present invention is the natural expansion of the gas as it rises in the liquid (due to a continually decreasing liquid pressure). The gas within each rising bucket will expand as the water pressure decreases at shallower depths of water. As the gas expands, more liquid is displaced so that the buoyant force acting on each bucket constantly increases during the rise. As a result, the bucket speed is increased; and the effect is more pronounced as the length of continuous loop of buckets is increased. Should the gas expand to the extent that the total gas volume exceeds the internal volume of the bucket, gas will be lost as it escapes over the bottom edge and the sides of the bucket. To avoid this problem, each bucket is provided with a partition 40 that separates the interior of the bucket into two sections—a primary chamber 42 and a reserve chamber 44. The expanding gas, rather than flowing over the bottom and sides of the bucket can pass from the primary chamber 42 into the reserve chamber 44 and thereby maintain the gas within the bucket.

In the operation of the present invention, only enough gas is admitted into each bucket so that, as the bucket rises and the gas expands, the gas completely displaces the liquid in the bucket when the bucket reaches liquid level. Thus, the energy input is not wasted as gas slippage which would be the case if the volume of the expanded gas became greater than that of the bucket.

Referring now to FIG. 3, a second embodiment of the present invention is shown having buckets 27 with liquid entry valves 46 in the innermost wall of each bucket relative to the chain 24 and displacement ports 48 along the bottom edge 50 of the bucket. Also shown is a variation of the second embodiment that includes a gas guide 51 in the top of the bucket. Chains 24 are secured to the innermost bucket wall to permit rotation about the sprockets as previously described. The liquid entry valves 46 and displacement ports 48 could be used with buckets 26 as shown in FIGS. 1 and 2 provided the chains 24 are secured to the innermost bucket wall rather than to the bucket sides. In addition, this embodiment can include a partition 40 along each side of the bucket to form a primary chamber 42 and reserve chambers 44, also as previously described.

A ridge 49 along the top of the bucket 27 provides a surface for the bucket to join with the bottom edge 50 of a preceding bucket and form an ascending and descending column of joined or nested buckets which move through the liquid with minimum turbulence. The ridge also restricts the twisting effect of the buckets relative to the chain 24 which can be produced as the buckets pass through the liquid. This reduces horizontal bucket motion and therefore increases the efficiency of the apparatus.

The displacement ports 48 are cutaway sections along the bottom edge 50 of the bucket 27 which allow liquid to exit from the bucket as the gas expands on the ascending side of the apparatus. Note that the innermost edge of the cutaway section forming the displacement port 48 must not be coplanar with the top of the partition 40 that separates the primary chamber 42 and the reserve chamber 44. If the two were coplanar, especially as measured on the innermost wall of the bucket where the displacement port must extend the full length of the bucket so that the bucket can swing clear of a following bucket during rotation about the sprockets 20 and 22, gas that expanded in the primary chamber 42 as the bucket rose through the liquid would pass from the bucket through the displacement port rather than into the reserve chamber 44. The gas spillage, of course, is of less concern on the outermost wall of the bucket since in preferred practice the displacement port on that bucket wall extends along only part of the bottom bucket edge 50. The ports 48 also permit the liquid to flow from the bucket as the gas enters at the lower sprockets 22.

The gas guide 51 is an indentation formed in the top of the bucket 27 to direct gas from the inlet tube 28 at the lower sprockets 22 into the preceding bucket on the chain 24. The guide 51 also serves as a passage through which gas can escape with minimum turbulence from the preceding bucket as liquid enters that bucket at the upper sprockets 20.

The liquid entry valve 46 (see FIGS. 4A and 4B) is a springloaded device that covers an opening 52 in the side of each bucket 26. The valve 46 acts to increase the speed of the liquid-gas displacement as the buckets revolve about the upper sprockets 20. As indicated in FIG. 3, an extending member 54 of the liquid entry valve is adapted to engage a cam 56 positioned about each upper sprocket 20. The cam 56 is arcuate-shaped and has the same outer radius as the radius of the upper sprockets 20. The engagement of the extending member 54 with the cam 56 opens the valve 46 and allows liquid to flow into the bucket 26. A similar cam could be positioned about each lower sprocket 22 to engage the extending member 54 of the liquid entry valve to speed the displacement of the liquid from the bucket as the bucket is filled with gas. The length of the working surface of the cam 56 determines the time that the liquid entry valve 46 is open. Therefore, when the gas filled buckets round the upper sprockets 20, liquid is admitted into the buckets at two points—over the bottom edge 50 of the bucket and through the opening 52 in the side of the bucket. A rapid liquid-gas displacement is critical to the efficient operation of the apparatus, and all gas must be removed from each bucket before the bucket passes the upper sprockets 20 and descends through the liquid.

Without the liquid entry valve 46, all liquid would enter the bucket through the displacement port 48 over the bottom edge of the bucket. While the displacement port and the bottom bucket edge may cooperate to form an adequate displacement means when the chain rotates slowly, at high speeds of rotation the liquid-gas displacement may not be completed when the bucket is submerged on the descending side of the apparatus. Any gas trapped in a descending bucket would create an upwardly directed force acting in opposition to the buoyant forces on the ascending side of the apparatus.

Referring again to FIGS. 4A and 4B, the valve 46 comprises a plate 58 which covers the opening 52 in the side of the bucket. The plate 58 is connected to the bucket 26 or 27 by a set of threaded bolts 60, each having a head 62 that is welded or bonded to the exterior surface of the bucket. The shaft 64 of each bolt 60 extends into the bucket. A spring 66 is positioned around each shaft 64 and is held in place by a stop nut 68 secured in a fixed position on the threaded end 70 of the shaft 64. A seal or gasket 72 can be placed between the plate 58 and the inside surface of the bucket wall. As further shown in view A of FIG. 4, the extending member 54 which includes a rotatable disk 74 is secured to the plate 58. As the buckets revolve, the rotatable disk 74 can engage the cam 56 of each upper sprocket 20. The cam 56 forces the extending member 54 and the plate 58 into the bucket to allow liquid to flow through the opening 52. When the bucket 26 completes the rotation about the upper sprockets 20 and enters the descending side of the chain, the springs 66 about each bolt shaft 64 compress the plate 58 and the seal 72 against the inner wall of the bucket as the rotatable disk 74 and the extending member 54 disengage contact with the cam 56.

FIG. 5 is a perspective view of a third embodiment of the present invention having collapsible buckets 76 in an enclosure 78 that contains the liquid and supports the components of the apparatus. The enclosure 78 can be used with either rigid buckets 26 or collapsible buckets 76; however, adequate clearance for bucket movement must be provided. For purposes of illustration, the present embodiment is shown with collapsible buckets 76 in the liquid-filled enclosure 78.

The system for admitting gas into the enclosure 78 includes an inlet tube 80 secured to the bottom section of outer wall 82 of the enclosure. The inlet tube 80 can be a straight member or U-shaped as illustrated in FIG. 5. A second means for admitting gas into the enclosure 78 comprises a pipe 84 having a slot 86 extending along the length of the pipe 84. The slot 86 can be best observed in FIG. 9. Attached to the pipe 84 about the slot 86 is a connecting member 88 formed by two plates 90 and 92 joined by side members 94 and having flanges 96 along the lower edge thereof which secure the plates to the pipe 84. The connecting member 88 is generally V-shaped in cross section with the narrow end of the V disposed about the slot 86 and the wide end of the V secured to the bottom section of the inner wall 97 of the enclosure 78 so that the gas can flow through the slot 86 and the connecting member 88 to enter the enclosure 78 and fill the collapsible buckets 76. A third plate 98 can engage the side members 94 between plates 90 and 92 to divide the gas flow through the connecting member 88 into two streams.

The gas flow and the folding action of the collapsible buckets 76 can be best described with reference to FIG. 6. The collapsible buckets are box-shaped and are adapted to open after rotating about the lower sprockets 22 and being filled with gas from the inlet tube 80 and the connecting member 88. The pressure of the gas flow into the enclosure should be sufficient to prevent the liquid from entering the inlet tube 80 and the connecting member 88. A conventional control valve (not shown) could be mounted where the inlet tube and the connecting member or the slot 86 join the enclosure 78 to control any liquid backflow caused by a decrease in the gas pressure. The collapsible buckets nest together on the ascending side of the enclosure 78 (as indicated by the counter-clockwise direction of bucket rotation) and fold flat to a closed position upon rotating about the upper sprockets 20. The collapsible buckets remain in the closed position while passing through the descending side of the enclosure.

The use of collapsible buckets is preferred and has several advantages over the use of rigid buckets. For example, means to replace the gas with liquid as the collapsible buckets round the upper sprockets 20 need not be provided because as each bucket folds to the closed position, the gas (or liquid) is forced from that bucket. In addition, when the collapsible bucket enters the descending side of the enclosure, the total bucket surface area exposed to the liquid is decreased and the folded bucket forms a streamlined surface so that the friction or drag of the bucket moving through the liquid is also decreased. Also, the compact configuration of the folded buckets can reduce the space required for the descending side of the enclosure 78 to minimize the total size of enclosure and thereby to enhance the portability of the apparatus.

The collapsible bucket should be formed of a material that will fold easily and wear well; for example, a polyethylene resin or reinforced rubber composition. The walls of the collapsible buckets are thin to facilitate molding, but have enough strength to withstand the buoyant forces of the gas. The number of folds in each bucket should be minimized since each fold constitutes a wear point and can shorten the useful life of the bucket. In addition, a large number of folds could lead to erratic folding and could form pockets between folds which trap gas when the bucket is closed rather than permit the gas to exit from the bucket.

The folding technique must be adaptable to rapid bucket opening and closing. One such technique is shown in FIG. 7. As illustrated, the walls of the collapsible bucket fold inwardly to form a compact structure. The bucket 76 is shown with a displacement port 48 extending along part of the bottom edge 50 of a bucket side (the outermost side when the bucket is secured within the apparatus) and a displacement port 48 extending along the entire innermost bucket side to provide clearance for an adjacent bucket as the buckets round the upper and lower sprockets 20 and 22. Reserve chambers 44 could be formed in the collapsible buckets but would increase the size of the folded structure. Liquid entry valves are not necessary in the collapsible buckets.

The collapsible buckets 76 can also include bracing cords (not shown) which assist in maintaining opposite sides of each bucket parallel when the bucket is filled with gas. The pressure within a bucket may tend to overextend or bulge the bucket sides. This would produce additional friction and turbulence as the buckets pass through the liquid. The bracing cord is a strong, flexible, non-stretching member that is connected along a bucket side to the top rear surface and the bottom front side of the bucket to keep opposite bucket sides parallel to each other and perpendicular to the bottom egde 50 of each bucket. When the collapsible bucket closes, the bracing cord folds into the bucket. The ends of the bracing cord can be secured to the bucket by conventional means.

The collapsible buckets 76 and the rigid buckets shown in FIG. 3 are secured along the innermost wall of each bucket to flat belts 100 (rather than to the roller-type chains 24 of FIGS. 1 and 2) which engage the upper and lower sprockets 20 and 22. The flat belts 100 can be cogged to provide a positive traction as the sprockets rotate.

When the collapsible buckets rotate about the upper sprockets 20, a series of roller assemblies 102 along the top outer edge of each bucket 76 engage a closing cam 104 on the outer wall of the descending side of the enclosure (FIG. 8). A roller assembly 102 comprises a ball 106 mounted in a housing 108 having a circular opening 110 with a diameter slightly greater than the diameter of the ball 106 to rotatably mount the ball 106 in the housing 108. Sufficient clearance must be provided so that the ball 106 can freely rotate within the housing 108. The roller assembly can also comprise a cylinder (not shown) in a housing that extends along the top outer edge of each bucket to engage the closing cam 104 in a like manner. The roller assemblies reduce the friction between the enclosure 78 and the bucket 76 particularly as the bucket enters the descending side of the apparatus to increase the life of the bucket.

The closing action of the collapsible bucket has an additional advantage over the use of rigid buckets. As a bucket collapses or folds, the center of gravity of the bucket is moved closer to the plane of the continuous chain or belts to reduce the centrifugal forces which tend to separate the belts from the sprockets as the buckets revolve about the sprockets. This effect can be important particularly at high speeds of rotation.

As with the previous embodiments, the liquid level can be maintained above the upper sprockets 20 to enable filling each bucket with liquid before the bucket rotates to the descending side of the enclosure 78. Alternatively, the liquid can be maintained within the enclosure at a level indicated by the line x—x. (See FIG. 6). As the speed of bucket rotation increases, the liquid will rise up the ascending side of the enclosure. A reservoir 112 is included at the upper end of the enclosure 78 to collect that liquid which moves up the ascending side of the enclosure with the buckets. As the rotational speed of the buckets is increased further, additional liquid will pour into the reservoir 112 so that the liquid level on the ascending side can be represented by the line y—y and the liquid level on the descending side of the enclosure is shown by the line z—z. The lowering of the liquid level in the descending side of the enclosure allows the buckets to move through the descending side with less resistance since the liquid fills only part of that section of the enclosure. Since an object passes more freely through a gas then through a liquid, it is advantageous to reduce the liquid level as much as possible on the descending side of the enclosure. Under preferred conditions, the bucket speed is controlled so that the liquid is completely removed from the descending side to minimize resistance to flow, and the ascending side of the enclosure is filled with the liquid to maximize the buoyant forces produced as the gas-filled buckets move through the liquid. When the rotational bucket speed decreases, the liquid can drain into the ascending side without spilling from the enclosure 78 and the liquid will return to the level x—x. In this manner, the liquid remains within the enclosure and maximum power output is achieved.

Rotary seals 114 can be provided about the shafts 14 and 16 and on the outside of the reservoir 112 to prevent liquid loss from the enclosure. As an additional feature, the top of the enclosure 78 can be covered to provide a self-contained system so that the gas that exits the buckets at the upper sprockets 20 can be collected and resused.

In each embodiment described, the bucket pitch or the distance between buckets as measured from bucket center to bucket center must permit the buckets to nest or fit together so that there is a minimal gap between adjacent buckets. The bucket pitch also determines the clearance between buckets upon rotation about the sprockets 20 and 22. The nesting configuration restricts the movement of each bucket about the joint connecting the chain and bucket to minimize the horizontal motion of the chain. This increases the efficiency of the apparatus, especially at higher speeds of chain rotation.

It will be understood that various changes and modifications can be made in the above described embodiments of the invention without departing from the spirit thereof, particularly as defined in the following claims.

What is claimed is:

1. An apparatus for converting the potential energy of a gas buoyant within a liquid into rotating mechanical energy comprising:
   (a) rotating means supported by a frame including at least two upper and lower sprockets freely rotatable about shafts mounted on said frame and being at least partially immersed within the liquid, each of said upper and lower sprockets supporting a continuous chain for movement about a horizontal axis of rotation; and
   (b) a plurality of adjacent buckets immersed in the liquid and coupled at each end to one of said continuous chains such that the buckets are equidistant and each bucket is in close proximity with an adjacent bucket to nest within said adjacent bucket for streamlined vertical movement about the horizontal axis of rotation, each bucket containing a vertical member to divide the bucket into a first chamber and a second chamber
whereby upon filling the first chamber of each bucket with a volume of the gas to displace the liquid from the first chamber of each bucket, the gas can expand when the bucket rises vertically through the liquid to flow from the first chamber into the second chamber and to prevent the gas from spilling from the bucket during the vertical rise so that the buckets move through the liquid with minimal turbulence and revolve the rotating means about the horizontal axis of rotation to generate power.

2. An apparatus for converting the potential energy of a gas buoyant within a liquid into rotating mechanical energy comprising:
   (a) rotating means supported by a substantially enclosed frame having first and second enclosed columns to contain the liquid, the first column having a substantially larger cross-section than the second column, both columns having open upper ends, said rotating means including at least two upper and lower sprockets freely rotatable about shafts mounted on said frame, the lower sprockets being at least partially immersed within the liquid, each of said upper and lower sprockets supporting a continuous belt for movement about a horizontal axis of rotation; and
   (b) a plurality of adjacent buckets immersed in the liquid and coupled to said continuous belts such that the buckets are equidistant and each bucket is in close proximity with an adjacent bucket to nest within said adjacent bucket for streamlined vertical movement about the horizontal axis of rotation, each bucket containing a vertical member to divide the bucket into a first chamber and a second chamber
whereby upon filling the first chamber of each bucket with a volume of the gas to displace the liquid from the first chamber of each bucket, the gas can expand when the bucket rises vertically through the liquid contained within the first column and can flow from the first chamber into the second chamber to prevent the gas from spilling from the bucket during the vertical rise so that the buckets move through the liquid with minimal turbulence and revolve the rotating means about the horizontal axis of rotation to generate power, the movement of the buckets causing the liquid to flow from the second column into the first column to decrease the resistance to flow of said buckets through said second column.

3. An apparatus in accordance with claim 1 or claim 2 wherein the edge of the open end of the bucket includes a cutaway section which facilitates fluid displacement from the bucket as said bucket revolves about the sprockets.

4. An apparatus in accordance with claim 1 or claim 2 wherein each bucket includes valve means coupled to an opening in the side of the bucket, said valve means being adapted to engage a cam means mounted to said frame adjacent to said upper sprockets for reciprocal movement relative to the opening whereby when said valve means engages the cam means the liquid can pass through the opening and into the bucket to displace the gas from the buckets.

5. An apparatus in accordance with claim 1 or claim 2 including adjustment means positioned adjacent to one of the shafts to move said shaft relative to another shaft whereby the chain or belt can be tightened or loosened.

6. An apparatus in accordance with claim 2 wherein the buckets are collapsible so that said buckets can be filled with the gas and opened to rise through the liquid contained within the first column and can be folded into a flat configuration to descend through the liquid contained within the second column with minimal resistance to flow.

7. An apparatus for converting the potential energy of a gas buoyant within a liquid into rotating mechanical energy comprising:
   (a) rotating means supported by a substantially enclosed frame having first and second enclosed columns to contain the liquid, the first column having a substantially larger cross-section than the second column, both columns having open upper ends, said rotating means including at least two upper and lower sprockets freely rotatable about shafts mounted on said frame and being at least partially immersed within the liquid, each of said upper and lower sprockets supporting a continuous chain for movement about a horizontal axis of rotation; and
   (b) a plurality of adjacent collapsible buckets immersed in the liquid and coupled at each end to one of said continuous chains such that the buckets, when opened and filled with the gas, are equidistant and each bucket is in close proximity with an adjacent bucket to nest within said adjacent bucket for streamlined vertical movement through said first column, but the buckets can be folded into a flat configuration to pass through the second column
whereby the buckets move through the liquid with minimal turbulence and revolve the rotating means about the horizontal axis of rotation to generate power and further including means for folding said collapsible buckets which comprises a series of cams disposed along the outer wall of the side of said frame adjacent said second column and a plurality of roller means mounted on said buckets which cooperate with said cams to fold the buckets after said buckets rotate about said upper sprockets.

8. An apparatus in accordance with claim 7 wherein said roller means comprises a ball mounted within a housing such that the ball can rotatably engage one of said cams to reduce friction between the enclosed frame and the buckets as the buckets pass through the second column in the enclosed frame.

* * * * *